Aug. 3, 1965    G. B. ANDERSON    3,198,364
ROAD VEHICLES
Filed Feb. 6, 1963    2 Sheets-Sheet 1
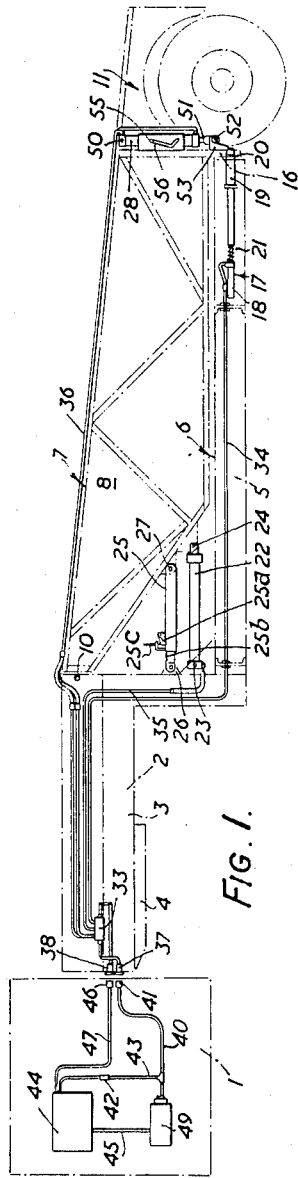
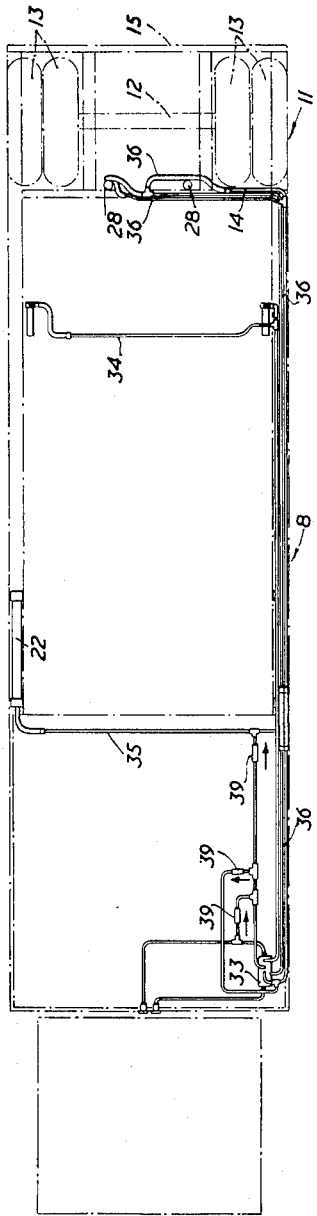
INVENTOR
Geoffrey B. Anderson
BY
Baldwin & Wight

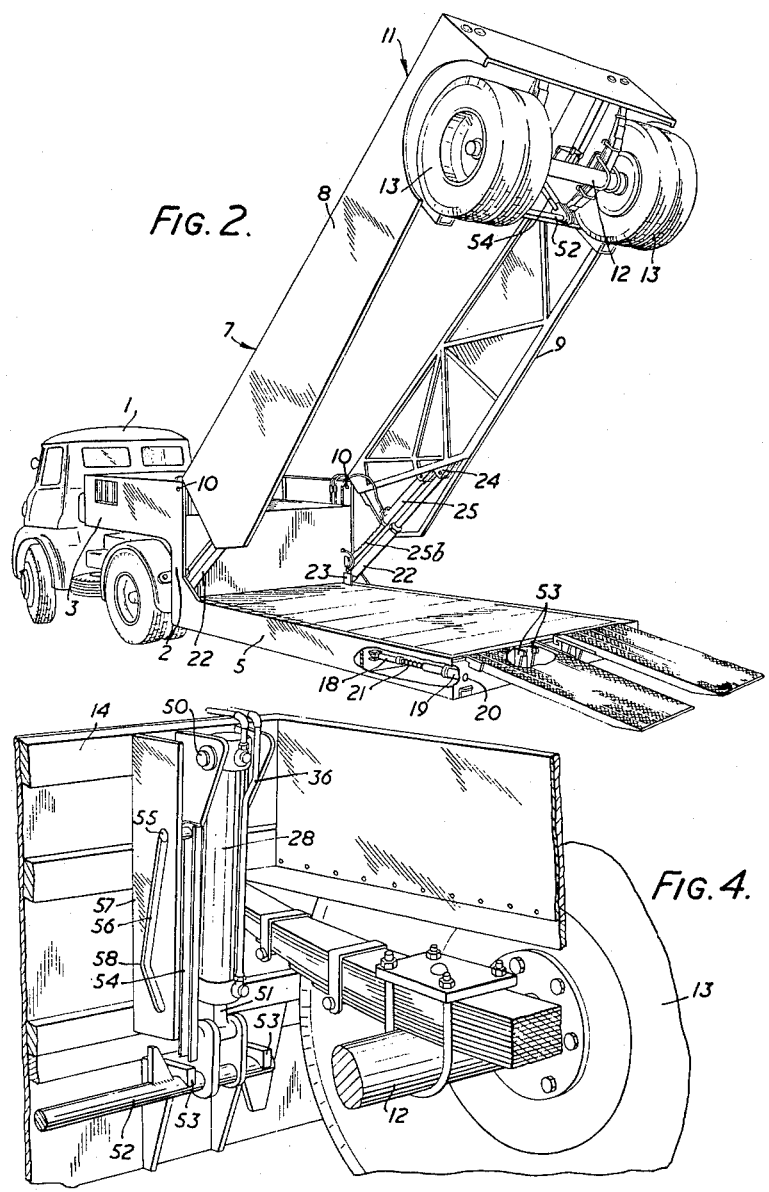

United States Patent Office 3,198,364
Patented Aug. 3, 1965

3,198,364
ROAD VEHICLES
Geoffrey B. Anderson, Andover, England, assignor to Charles Pitt (Barton Stacey) Limited
Filed Feb. 6, 1963, Ser. No. 256,570
Claims priority, application Great Britain, Feb. 6, 1962, 4,525/62
11 Claims. (Cl. 214—505)

This invention relates to road vehicles and especially commercial vehicles employed in the transportation of goods, whether the vehicles be in the form of self-propelled vehicle, or a trailer or semi-trailer towed by a prime-mover.

In vehicles of this sort it is usual to provide a body portion which together with a floor provides a confined or enclosed space in which goods can be stowed for transportation. The floor and/or the body may be attached to or form part of the chassis of the vehicle concerned.

One of the disadvantages of this type of arrangement is that the floor is not accessible from outside the vehicle unless the body sides are dropped, or otherwise removed.

According to the present invention a road vehicle has a body portion which together with a floor provides a confined or enclosed space in which goods can be stowed, and means are provided for raising the body to give access to the floor for loading and unloading.

In a preferred arrangement the body is hinged to pivot about an axis adjacent the front end of the vehicle, and this axis may be displaced upwardly from the floor. Thus when the body is pivoted about the axis it will provide access to substantially the whole of the floor of the vehicle apart from that end about which it is pivoted, and the advantages of such an arrangement are obvious.

According to a further feature of the invention the rear road wheels of the vehicle and their associated suspension are mounted on the body and are raised therewith. With this arrangement therefore the general level of the floor can be beneath the level of the tops of the road wheels thus making it suitable for the acceptance of heavy loads which are difficult to raise.

This arrangement therefore allows the road wheels to be mounted on an axle or a cross shaft which is carried by an extension of the body which extends rearwardly beyond the floor.

In order to make the body even more acceptable to heavy loads the floor may be arranged to be capable of being lowered from its normal position to a low loading position, and preferably the forward end of the floor is arranged to pivot about an axis adjacent the front of the vehicle so that the rear end thereof can be lowered to ground level. Very heavy loads and awkward cargoes can therefore be moved straight on to the floor of the vehicle, which can be subsequently raised to its normal position for road transport use.

Preferably power-operated means are provided for raising the body, and these means may include a hydraulic ram arranged between the body and the part of the vehicle to which the floor is attached.

When the invention is embodied in a trailer or semi-trailer for towing by a prime-mover, the source of power for the power operative means is preferably provided in the prime-mover, the power being transmitted therefrom to the trailer.

The invention may be performed in various ways but one embodiment will now be described with reference to the accompanying drawings in which FIGURE 1 is a diagrammatic side elevation of a semi-trailer incorporating the invention, FIGURE 2 is an isometric view of the semi-trailer shown in FIGURE 1, in its loading position, with the floor lowered and the body raised, FIGURE 3 is a diagrammatic plan view of the semi-trailer shown in FIGURES 1 and 2, and, FIGURE 4 is an isometric view of the apparatus for lowering the floor of the trailer shown in the other figures.

In the arrangement shown in the drawings the prime-mover for towing the trailer is indicated diagrammatically at 1, and the chassis of the trailer at 2. The trailer is of the low loading type, and the chassis 2 is cranked to provide a forward part 3 having the usual boss 4 which co-operates with the standard swivel plate provided on a towing prime-mover. The rear part 5 of the chassis 2 provides a floor surface 6 on which loads can be stored for carriage. The body of the trailer is shown generally at 7 and is of fabricated construction. This body portion comprises a pair of side walls 8 and 9 which are pivoted at 10 to the forward part 3 of the chassis 2. The rear end of the body 7 is provided with an extension 11 which carries a transverse axle or shaft 12 by means of suitable suspension means, shown in FIGURE 2, and on which are mounted two pairs of road wheels 13. The sides 8 and 9 of the body extend over the wheels to provide suitable mudguards, and walls 14, 15 define respectively the end of the carriage space on the floor and the rear end of the trailer. Such walls could of course be replaced by merely a cover over the rear wheels.

Each side 8 and 9 of the body is provided with a downwardly extending lug 16, and a hydraulic locking device 17 is provided on each side of the rear part 5 of the chassis 2. Each of these devices is in the form of a single acting ram 18 which is connected to an axially slidable bolt 19 which is biased by means of a coiled spring 21 towards a position in which its end 20 projects. The projecting end 20 of each of the bolts 19 engages a suitable hole provided in one of the lugs 16, so that the body 7 is effectively locked to the chassis 2. To unlock the chassis the ram 17 is operated to withdraw the ends of the bolt 20 from their co-operating holes.

A single acting hydraulic ram 22 is provided at each side of the chassis 2, one end of each of these rams 22 being pivotally connected to the chassis at 23 and the other end of each ram being pivotally connected to a point 24 adjacent the lower edge of each of the walls 8 and 9.

Mounted immediately above each of these rams 22 is a ratchet device 25 which is pivoted at 26 and 27 to the chassis and the side wall of the body respectively. This device 25 comprises a two part telescopic strut, one part of which carries a pawl 25a, and the other part of which carries a ratchet member 25b which engages with the pawl to prevent the strut being collapsed after it has been extended, manual cable operated means 25c being provided for withdrawing the pawl to allow the strut to collapse.

As is most clearly shown in FIGURE 4, a pair of double-acting hydraulic rams 28 are pivoted at 50 to the end wall 14 of the body, or to some suitable mounting if such an end wall is not provided. The operative member 51 of each ram is connected to a transverse support bar 52 which extends across the width of the chassis 2, and which co-operates with lift hooks 53 projecting from the end of the rear part of the chassis 5. In order to ensure that the rams 28 can be disconnected from the hooks 53, a connecting link 54 is rigidly connected to each operative member, this link 54 having a stud 55 which is free to move in a cranked slot 56 provided in a guide member 57. Thus when the rams 28 are operated to lower the chassis the studs 55 will move down their slots 56 until they reach the point 58 by which time the lower edge of the rear part 5 of the chassis will have reached ground level. Continued operation of the rams will now cause them to be pivoted about their pivot points 50 so that the support bar 52 will be moved clear of the hooks 53. When it is required to raise the floor the reverse operation takes place, the support bar 52 engaging the hooks 53 as the operative members of the rams are raised.

In order to control all the various hydraulic devices appropriate pipe-lines are arranged about the trailer, and hydraulic fluid is supplied to these through a control valve 33 which can operate to supply hydraulic fluid to the pipe lines 34 leading to the rams 17, to the pipe lines 35 leading to the rams 22, and the pipe lines 36 leading to the double-acting rams 28, either singly or together. Hydraulic fluid under pressure is supplied to the control valve 33 through a quick-release coupling 37 provided at the front end of the trailer, and relief fluid is removed from the control valve through a quick-release coupling 38. Non-return valves 39 are also provided in the hydraulic pipe lines to ensure the correct direction of flow, the direction of flow through these non-return valves being indicated by the arrows.

A pump 49 is provided on the prime-mover 1, which can be driven from the engine thereof, and this supplies hydraulic fluid under pressure through a pipe line 40 to a coupling 41 which can engage the quick-release coupling 37 on the trailer. A relief valve 42 is provided in a pipe line 43 leading from the pipe line 40 to a reservoir for hydraulic fluid 44, and the pump draws hydraulic fluid from this reservoir 44 through a passage 45. The quick-release coupling 38 on the trailer is arranged to cooperate with a coupling 46 on the prime-mover which is connected to a pipe line 47 which acts to return relief fluid to the reservoir 44 from the coupling 38 when the trailer is connected to the prime-mover.

When the trailer is to be loaded the single acting rams 17 are operated to withdraw the bolts 19 from the lugs 16. Operation of the double-acting rams 28 in the appropriate direction now acts to lower the rear end 5 of the chassis to ground level by pivoting it about the pivot on the standard swivel plate on the prime-mover. It will be appreciated that at the same time the body will also pivot to a small extent about the point 10, and the single acting rams 22 will be slightly extended under the same action. With the rear end of the trailer chassis now at ground level and the support bar 52 clear of the hooks 53 the rams 22 are actuated so that the trailer body, complete with road wheels, is pivoted about the axis 10 to a raised position as shown in FIGURE 2 in which it is maintained by the rams 22. As will be seen the floor 6 is now completely exposed and goods can be loaded on to it. For example a fork lift truck or loading truck can be driven directly on to the lowered end of the floor.

To return the trailer to a position ready for road use the ratchets 25 are released by the cable operated means, and the pressure fluid to rams 22 is connected to relief. The rams are allowed to fall under gravity, the flow of fluid from the rams being restricted so that it falls at a controlled speed. When the rear wheels 13 have again reached ground level the double-acting rams 28 are actuated in the lifting direction and automatically engage the floor and lift it complete with its load into its normal position. The hydraulic fluid to the rams 17 is now connected to relief and the spring 21 forces the bolts in an axial rearward direction so that their ends 20 engage the holes in the lugs 16, thus locking the floor in position. The hydraulic fluid to the double-acting rams 28 can now again be coupled to relief, as the floor is supported by the bolts 19 and the trailer is now ready to be towed by the prime-mover.

I claim:

1. A road vehicle including a load carrying floor pivotally mounted for movement between a position in which its rearward end is adjacent the ground and a raised operating psition in which the floor is clear of the ground; a vehicle body having an extension extending rearwardly beyond the floor; rear road wheels; suspension means comprising an axle mounted upon said body extension and carrying said rear road wheels; a hinge at the forward end of said body; and means for pivoting said vehicle body about said hinge upwardly in relation to said load carrying floor to a raised position in which said rear road wheels are located above said floor.

2. A road vehicle including a load carrying floor pivotally mounted for movement between a position in which its rearward end is adjacent the ground and a raised operating position in which the floor is clear of the ground; a vehicle body having an extension extending rearwardly beyond the floor; rear road wheels; means for suspending said rear road wheels from the vehicle body comprising an axle mounted upon said body extension and carrying the wheels; power operated means for locking said body and said floor together when the latter is in its raised operating position; power operated means connected between said body and said floor for raising and lowering the load carrying floor in relation to the ground; and power operated means for moving said vehicle body about said hinge upwardly in relation to said load carrying floor to a raised position in which said rear road wheels are located above said floor.

3. A road vehicle as claimed in claim 2 in which said locking means includes a single acting hydraulic ram and said floor raising and lowering means includes a double acting hydraulic ram.

4. A road vehicle as claimed in claim 3 including a self-releasing coupling between said double acting hydraulic ram and said load carrying floor which is operatively arranged to release when said floor is adjacent the ground.

5. A road vehicle as claimed in claim 3 including a self-releasing coupling between said double acting hydraulic ram and said load carrying floor which is operatively arranged to release when said floor is adjacent the ground and to re-couple when said double acting hydraulic ram is operated to raise said floor to its raised operating position.

6. A road vehicle as claimed in claim 2 in which said power operated means for moving said body includes a hydraulic ram operatively connected between said body and a part of the vehicle to which said floor is connected.

7. A road vehicle as claimed in claim 6 and further including a ratchet device which is operatively connected to said body and which is operative when said body is raised.

8. A road vehicle as claimed in claim 7 in which said body and said floor are incorporated in a trailer and further including a prime mover operatively connected to said trailer, said hydraulic rams being arranged for operation by power fluid supplied from power means carried by said prime mover.

9. A road vehicle including a load carrying floor; a vehicle body associated with said load carrying floor, said body having forward and rearward ends and having an extension extending rearwardly beyond said floor; rear road wheels; means for suspending said rear road wheels from the rearward end of said body, said suspending means including an axle mounted upon said body extension and carrying said rear road wheels; a hinge at the forward end of said body; and means for moving said vehicle body about said hinge upwardly in relation to said load carrying floor to a raised position in which said rear road wheels are disposed above said floor.

10. A road vehicle including a load carrying floor; a vehicle body associated with said floor; rear road wheels; means for suspending said rear road wheels from the rearward end of said body; hinge means mounting said vehicle body for pivotal movement with respect to said load carrying floor, the body being movable upwardly in relation to the floor to a raised position in which said rear road wheels are disposed above the floor; and a power operated locking and operating means which is operatively connected between said body and said load carrying floor to raise and lower said floor in relation to the ground.

11. A road vehicle including a load carrying floor; a vehicle body associated with said floor; rear road wheels; means for suspending said rear road wheels from the rearward end of said body; hinge means mounting said vehicle body for pivotal movement with respect to said load carrying floor, the body being movable upwardly in relation to the floor to a raised position in which said rear road wheels are disposed above the floor; and power operated means operatively connected to said body to lift it to its said raised position.

References Cited by the Examiner

UNITED STATES PATENTS

| | | | |
|---|---|---|---|
| 28,969 | 7/60 | Cooley | 214—63 |
| 1,512,059 | 10/24 | Sanford | 105—364 |
| 2,708,044 | 5/55 | Sher et al. | 214—394 |
| 2,954,137 | 9/60 | Ash | 214—505 |
| 3,000,523 | 9/61 | Nicolas | 214—505 |
| 3,044,645 | 7/62 | Smith | 214—505 |

GERALD M. FORLENZA, *Primary Examiner.*

HUGO O. SCHULZ, *Examiner.*